United States Patent
Ben Ayed

(10) Patent No.: US 9,032,498 B1
(45) Date of Patent: May 12, 2015

(54) METHOD FOR CHANGING AUTHENTICATION FOR A LEGACY ACCESS INTERFACE

(71) Applicant: Mourad Ben Ayed, Cupertino, CA (US)

(72) Inventor: Mourad Ben Ayed, Cupertino, CA (US)

( * ) Notice: Subject to any disclaimer, the term of this patent is extended or adjusted under 35 U.S.C. 154(b) by 0 days.

(21) Appl. No.: 14/287,028

(22) Filed: May 25, 2014

(51) Int. Cl.
*G06F 21/35* (2013.01)
*H04W 12/06* (2009.01)

(52) U.S. Cl.
CPC ............... *G06F 21/35* (2013.01); *H04W 12/06* (2013.01)

(58) Field of Classification Search
CPC .............................. G06F 21/35; H04W 12/06
USPC ................. 726/2–5, 9; 713/168, 185
See application file for complete search history.

(56) References Cited

U.S. PATENT DOCUMENTS

| | | | |
|---|---|---|---|
| 6,934,848 B1 * | 8/2005 | King et al. | 713/182 |
| 6,976,164 B1 * | 12/2005 | King et al. | 713/156 |
| 7,219,137 B1 * | 5/2007 | Smith et al. | 709/219 |
| 7,401,144 B1 * | 7/2008 | Smith et al. | 709/225 |
| 7,580,946 B2 * | 8/2009 | Mansour et al. | 707/102 |
| 8,045,961 B2 | 10/2011 | Ayed | |
| 8,699,952 B2 * | 4/2014 | Yeung | 455/41.2 |
| 2003/0105725 A1 | 6/2003 | Hoffman et al. | |
| 2005/0177577 A1 * | 8/2005 | Asokan et al. | 707/100 |
| 2008/0082569 A1 * | 4/2008 | Mansour et al. | 707/102 |
| 2009/0104888 A1 | 4/2009 | Cox et al. | |
| 2009/0221266 A1 | 9/2009 | Ohta et al. | |
| 2012/0084563 A1 * | 4/2012 | Singhal | 713/168 |
| 2013/0117832 A1 * | 5/2013 | Gandhi et al. | 726/7 |
| 2013/0159119 A1 | 6/2013 | Henderson et al. | |

OTHER PUBLICATIONS

Zhi Fu et al; Access Control and Authentication for Converged Wireless Networks; Published in: Mobile and Ubiquitous Systems—Workshops; 2006; 3rd Annual International Conference; Date of Conference: Jul. 17-21, 2006; pp. 1-8; IEEE Xplore.*

Czeskis et al.; Strengthening user authentication through opportunistic cryptographic identity assertions; Proceeding CCS '12; Proceedings of the 2012 ACM conference on Computer and communications security; 2012; pp. 404-414; ACM Digital Library.*

* cited by examiner

*Primary Examiner* — Bradley Holder
(74) *Attorney, Agent, or Firm* — Daniel B. Schein

(57) ABSTRACT

A method and apparatus for changing authentication for a legacy access interface using an access adapter and a token device. The method enables to change authentication factors based on context and allows secure multi-user sharing of legacy applications.

20 Claims, 11 Drawing Sheets

METHOD FOR CHANGING AUTHENTICATION FOR A LEGACY ACCESS INTERFACE

PRIORITY

The present application is a Continuation-In-Part ("CIP") of pending U.S. patent application Ser. No. 13/935,490, filed Jul. 4, 2013.

FIELD OF THE INVENTION

The present invention relates to systems and methods for multi-factor authentication, and most particularly, adaptive authentication using a smart token device.

BACKGROUND

While passwords are a vital component of system security, they can be cracked or broken relatively easily. Password cracking is the process of figuring out or breaking passwords in order to gain unauthorized entrance to a system or account. It is much easier than most users would think. Passwords can be cracked in a variety of different ways. The most simple is the use of a word list or dictionary program to break the password by brute force. These programs compare lists of words or character combination against password until they find a match.

Another easy way for potential intruders to nab passwords is through social engineering: physically nabbing the password off a Post-It from under someone's keyboard or through imitating an IT engineer and asking over the phone. Many users create passwords that can be guessed by learning a minimal amount of information about the person whose password is being sought. A more technical way of learning passwords is through sniffers, which look at the raw data transmitted across the net and decipher its contents. "A sniffer can read every keystroke sent out from your machine, including passwords".

Recently, several companies were hacked, and recommended using two-step authentication or out of band SMS for authentication.

Also, more and more enterprises are introducing tablets, BYOD and cloud which are introducing new security challenges. Traditional multi-factor authentication technologies such as CAC card, RSA SecurID token . . . are difficult to use with tablets. These devices stay active when the user leaves them un-attended, and the devices are easily lost. Most importantly, a thief can wait for a person to log in before stealing the device with open session.

Recent application by the same inventor do not cover more sophisticated authentication methods, timeouts, user communication, Bluetooth and physical security.

Thus, a need exists for a smart token device that enables adaptive authentication to applications with better security features.

SUMMARY OF THE INVENTION

An access device and a token device, wherein the token device physically separated from the access device, and wherein the token device and the access device can communicate using short wireless communication when the distance between the token device and the access device is more than 30 cm; storing at least one digital key onboard the token device, wherein the at least one digital key is selected from the group consisting of: a password, a random key, a one-time-password generator, a certificate, a digital key, a Private Key Infrastructure (PKI) key, a symmetric key, an asymmetric key, a payment information, and an access information.

Obtaining at least one token identifier wirelessly, if the at least one token identifier is authorized for access, performing an authentication action depending on a context selected from the group consisting of: data profile, application profile, user profile, access device profile, current time, current policy, current location and current motion, wherein the authentication action corresponds to a method selected from the group consisting of: "something only the user has", "something only the user knows", and "something only the user is", and wherein the requested authentication action is different from a second authentication action requested for a different user transaction with a different context; obtaining at least one second key using short wireless communication, wherein the at least one second key corresponds to the at least one digital key from the token device.

The at least one second key is used to perform an action selected from the group consisting of: decrypt encrypted stream of data in real-time, decrypt encrypted data, login to an application, unlock a screen, unlock a door lock, authorize a transaction, emulate an RFID identifier, and activate a badge reader.

BRIEF DESCRIPTION OF THE FIGURES

The present inventions may be more clearly understood by referring to the following figures and further details of the inventions that follow.

Similar reference numerals are used in different figures to denote similar components.

FURTHER DETAILS OF THE INVENTIONS

This patent teaches a method for facilitating authentication using a mobile device. This patent teaches using either an application onboard a mobile device for authentication to any application on any terminal.

The current application improves over the previous application with:

Improving integration with any system using I/O emulation or radio frequency (RFID) emulation. and no source code, no programming and no API integration.

I/O emulation involves causing the operating system to send keystrokes/mouse movements/mouse clicks to an application. The keystrokes/mouse movements/mouse clicks can be recorded during a first recording session. The keystrokes can be modified to account for a new identifier or a new parameter value.

RFID emulation involves imitating an RFID tag. When an RFID reader transmits an encoded radio signal to interrogate the tag, the RFID tag receives the message and then responds with its identification and other information.

The other area of improvement involves using PKI for enrollment and for security. The data on the terminal is encrypted with a user's public key available from a database.

That data can only be decrypted by sending it to a user's token device which can decrypt it with a private key.

Improving access security with two-man-rule authentication feature where 2 people have to approve access.

Improving access security with adaptive timeout where the timeout changes depending on where the user is.

Improving security by displaying transaction and confirmation/receipt information as this adds better user communication and prevents some man-in-the-middle attacks.

Improving security through enabling physical security with the mobile device, and emulating access codes to physical access readers.

The current invention uses a smart phone application or a hard token to authenticate transaction on any type of terminal using adaptive authentication, and to facilitate or harden the user login based on location risk, transaction risk, user risk . . . .

The invention enables to leverage a smart phone application program or a hard token to authenticate login on any type of terminal using adaptive authentication, and to close the session if the user moves or separates from the terminal.

The invention enables to add multi-factor authentication to any application including applications that run in a browser, iOS applications, Android applications, Windows application, Windows OS, Mac OS, or any embedded application that has access to the internet . . . .

Figure 1:
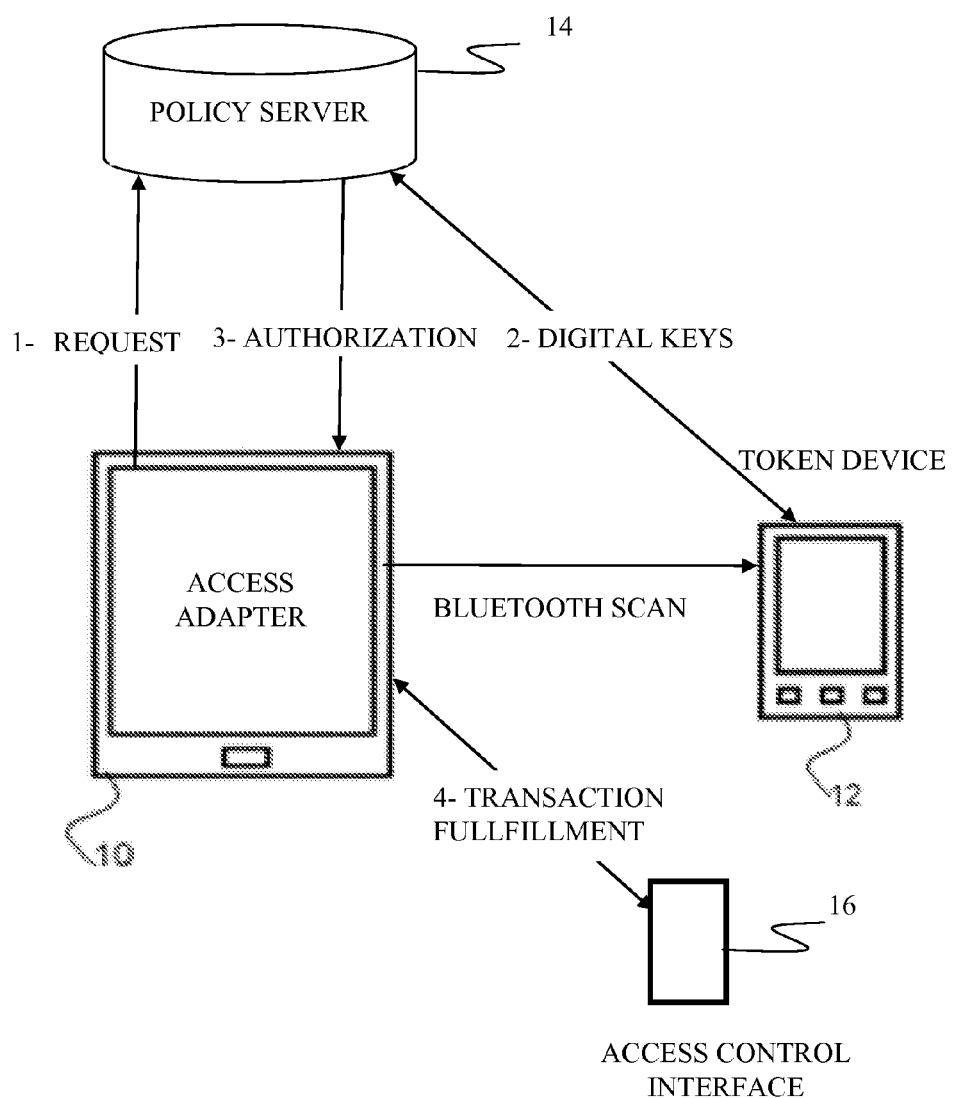
FIG. 1 is a schematic illustrating a cloud-based adaptive authentication system using a mobile device.

Referring to FIG. 1, a cloud-based adaptive authentication system using a smart phone according to a first embodiment includes a user application device 10, a mobile authentication device 12, a communication server 14 and an application server 16.

User application device 10 can be any device including a mobile device, a computing device, a television set, a point of sale terminal, a door entry reader. User application device 10 communicates with communication server 14 and with application server 16 using wireless/cellular data communication or wired communication. User application device 10 runs applications or operations that collaborate with application server 16 to provide services to the user such as data, documents, forms, workflows, CRM, payment operations, physical access, door access, etc.

User application device 10 can request login/connection to application server 16; however, it needs the user credentials. Those user credentials can only be supplied by mobile authentication device 12 and through communication server 14.

User application device 10 can hold encrypted user login information for application server 16. The encrypted user login information can only be decrypted using digitals keys obtained from mobile authentication device 12 and through communication server 14. Once decrypted, the user login information can be used to login to application server The invention involves a user initiating a transaction from a application device 10, the user providing authentication from a mobile authentication device 12 that is physically separate from application device 10, and using the target service onboard application device 10. The service can be provided from a remote server.

The user logs in to an account on communication server 12. The sign-up process requires certain information, such as information about a user account. The sign-up process may include other information such as username/password for different accounts, financial account sufficient to perform a transaction with the account. The sign up process can also require contact information for the user, e.g., mailing address and email, and possibly other personal identifying information, e.g., a photograph of the user. After creating an account, the user can select a merchant that also has an account with the cardless payment system. The user can give consent to perform a cardless payment transaction with the merchant if the user is within a predetermined distance from the merchant. After the user gives consent, the merchant can, without a presentment of the physical payment card, charge (in the case of credit cards) or debit (in the case of debit cards) the user's financial account for items the user wants to buy using a a user's payment card or account that is already on file with the cardless payment system. The user does not need to physically present a credit card to the merchant.

The user can sign up using a mobile application or using an online website, and can use the mobile authentication device 12 or another computing device as application device 10, e.g., a home computer. At some point prior to the transaction, a user authentication application program is downloaded to the user mobile authentication device 12, e.g., through an application store. Creation of the user account can be handled through the user application, or through another application, e.g., a generic web browser. The user enters a name, account password, and contact information, e.g., email address. The user can enter financial account information sufficient to conduct a financial transaction. Mobile authentication device 12 is a smart phone that has a unique identifier, that it is connected to the network or internet possibly through 3G or Wifi, and that it is equipped with an accelerometer, a tilt detector and/or Bluetooth. When the user signs up with the mobile application, the device unique ID is registered with the user's account so as to guarantee that the account it tightly linked to mobile authentication device 12. Data sent to application device 10 can be encrypted with the device's ID in order to guarantee that only an authorized corresponding device can read data sent from mobile authentication device 12.

Communication server 14 holds user accounts and serves as a communication medium between application device 10 and mobile authentication device 12. Communication server 14 can also hold policies that dictate authentication rules. In a preferred embodiment, communication server 14 does not store any user login or authentication information beyond the time span of the transaction. Immediately after application device 10 retrieves the user information, the user login or authentication information is deletes. In this embodiment, the user login and authentication information is encrypted and stored on the user application device 10. This ensures that user login and authentication information is never kept in one place, and is distributed over the user terminals. The advantages is that 1) there is no central repository for the user access and authentication information for multiple applications 2) Each terminal holds encrypted login and authentication information 3) The authentication information cannot be decrypted without physically having mobile authentication device 12 and authenticating to the authentication application 4) Different login and authentication information for different applications are encrypted with different application digital keys stored on mobile authentication device 12.

Application server 16 authenticates users and provides services. A user must have a user account and must authenticate to that account in order to receive services. A service can be transactional in nature such as a payment, loyalty, door entry that is authorized against a user's payment, loyalty, physical access account, or can last over a period of time, such as access to a bank account, email, or any other service.

A normal transaction starts with a user requesting a service using application device 10. Application device 10 sends a request to communication server 14. The user is notified to authenticate the transaction using mobile authentication device 12. Once the user activates the authentication application on mobile authentication device 12, it obtains the request from communication server 14, authenticates the user using adaptive authentication, and supplies the digital keys for the transaction. Application device 10 obtains the digital keys for the transaction, and uses them to request authorization from application server 16. Once authorized, application server 16 provides services to the user over application device 10. Also, if mobile authentication device 12 detects user motion is above a predetermined threshold or user separating from application device 10, the mobile authentication device 12 stops posting updates to communication server 14 and application device 10 can lock the user session. Authentication device 12 uses an onboard accelerometer, tilt sensor or Bluetooth/Bluetooth LE transceiver.

The user account on communication server 14 is paired with at least one smart phone unique identifier. The user cannot log in to the account without a paired smart phone. Pairing is a way of associating or linking a smart phone application to a user account. During registration, a unique identifier for the smart phone is stored in the user account on the remote server. During subsequent logins, the application onboard the smart phone obtains the unique identifier of the smart phone, and uses it to authenticate to the user account on the remote server.

Figure 2:
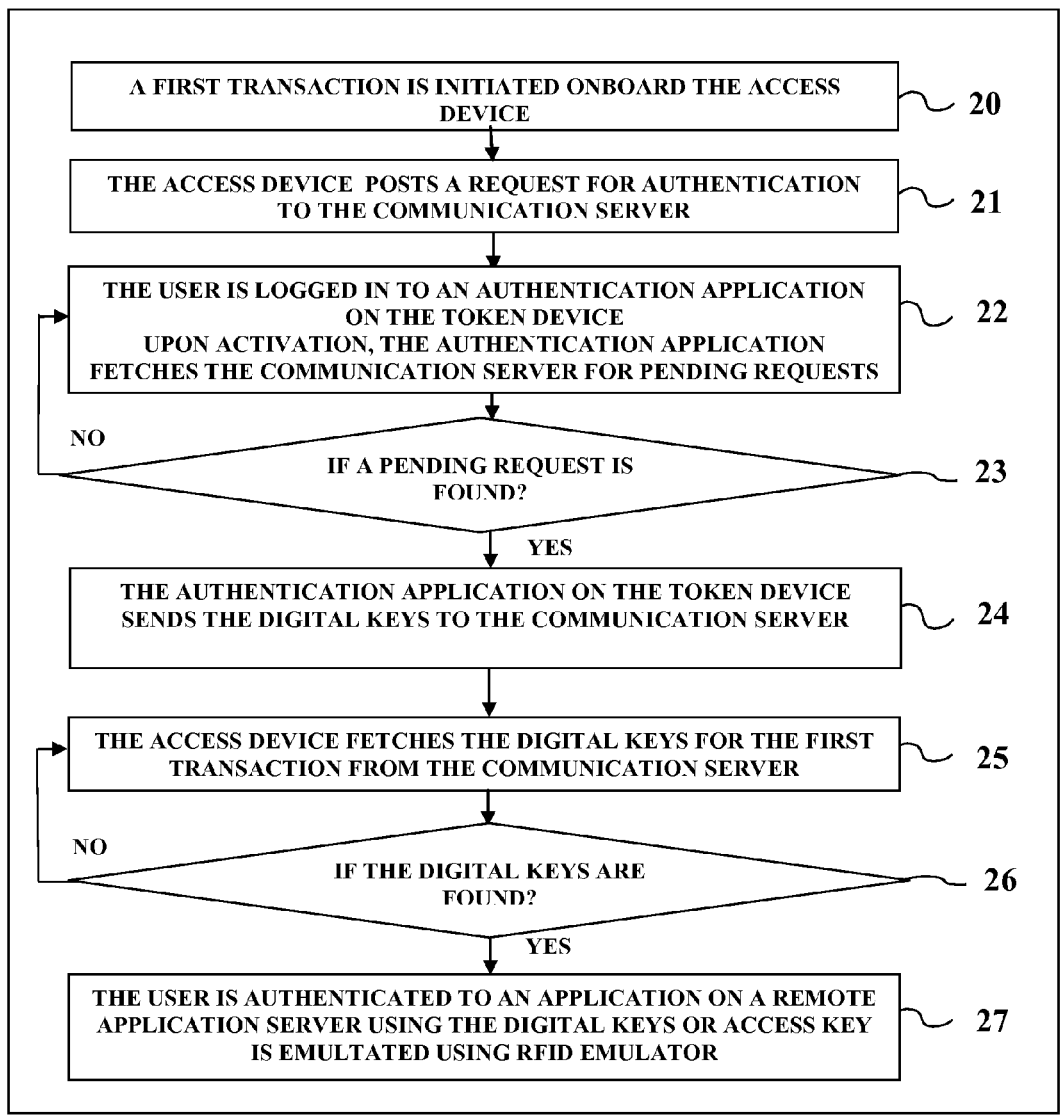
FIG. 2 is a flowchart illustrating a method for facilitating authentication using a mobile device.

Referring to FIG. 2, a flowchart illustrates a method for facilitating authentication using a smart phone. In step 20, a first transaction is initiated onboard application device 10. For example, a user requests login to a bank account through a web browser, or a user requesting to purchase something from an application, or a user requests to purchase something on a TV set, or a user requesting to purchase something on a Point of Sale terminal, etc.

The user can provide a user identifier such as a user name or a phone number. Alternatively, application device 10 can scan a user's device id wirelessly using Bluetooth, scan a bar code, obtain an identifier from memory, or obtain an identifier from a database.

Alternatively, the user identifier can be determined automatically through profiling such as a TV set determining who is in the room based on computer vision or other information.

The user can determine the transaction, or the transaction can be determined automatically from the current context. For example, if the user is watching a show, and there is a button or icon to purchase an item, the user can click on that button, and the transaction request will be automatically filled. The user may enter a quantity.

The button or icon can also be part of an application onboard the merchant terminal 10. When the application detects that the user moved, the application can lock access to the button or icon.

To detect the user has moved, the application can establish a Bluetooth/Bluetooth LE link with the mobile authentication device 12, and if the Bluetooth signal strength falls below a predetermined threshold, the application locks . . . .

Alternatively, the application can post verification transactions to communication server 14. If the user authentication application does not respond, the application locks . . . . Also, if the user authentication application detects motion, it stops updating the verification requests on the communication server 14, and that causes the application to lock or cloak, cancel transaction . . . .

Alternatively, the user can say that he/she saw an item for sale somewhere (billboard, TV channel, website . . . ) and a broker system can offer a selection of offers that the user can choose from. The user may enter a quantity.

In step 21, application device 10 posts a request for authentication to communication server 14 corresponding to a user account. The request for authentication can have the transaction details. Application device 10 can also post the required authentication method for the request based on policies corresponding to the transaction risk, location risk, user risk, device risk, time risk . . . , i.e. simple action verification, pass code verification or biometric verification based on context, such as in a trusted location/outside a trusted location/outside a country, or moving/still, or transaction profile or user profile . . . . This enables adaptive authentication or stepped up authentication whereby authentication is eased when the user/location/transaction risk is lower, and the authentication is hardened automatically when the user/location/transaction risk is higher.

The request for authentication can comprises a first transaction information such as the user name, the application name, the door name, door GPS, authentication type, the transaction name, the merchant name, the transaction amount, quantity, document name, or any other information, The transaction information may be presented to the user onboard authentication device 12 to solicit authentication.

Moreover, application device 10 can obtain policy information from a remote server policy database. The policy information indicate conditions for authorization such as:

Trusted locations defined by areas around a GPS coordinate or a WIFI network or an area near a known RF transmitter Security rules per trusted location, un-trusted location or area with no network connectivity (no WIFI, no 3G network, no data network) including: Authentication Type: PIN, No PIN, text challenge authentication, voice challenge authentication, timeout duration (when no user activity), and application self-defense (lock, cloak, alarm, call a phone number, send SMS/Email, wipe application data)

In step 22, the user is logged in to an authentication application onboard a smart phone mobile authentication device 12. The authentication application authenticates the user using the user account onboard communication server 14.

In a preferred embodiment, the authentication application requests user authentication on install or the first time is it run, and after that, it will not request the user to authenticate. In an another preferred embodiment, the user application requests the user to authenticate every predetermined period of time, where the predetermined period of time is updated using a web-enabled policy dashboard.

Authentication device 12 obtains sensor information from sensors located onboard the device, such as current location (from a GPS receiver), acceleration (from an accelerometer), gyration, tilt, Wifi networks in view, radio frequency networks in view, radio frequency signal strength, lighting level, audio level, temperature.

The authentication device 12 can post the sensor information to communication server 14. If the sensor information does not match the policy parameters, the authentication device 12 or application terminal 10 can: abort operation, block response, lock, exist, cloak, cancel the current transaction, encrypt data;

Upon detection of a user event or activation, the authentication application can fetches the communication server 14 for pending requests for the user. It can determine the current location of the mobile authentication device 12 and send it to communication server 14. If the distance between mobile authentication device 12 and application device 10 is below a predetermined threshold, then the pending request is processed. The location of the merchant device is generally static and known, or can be determined live using a GPS receiver, WIFI networks or radio frequency beacons such as Bluetooth beacons. The location of mobile authentication device 12 is determined live using a GPS receiver, WIFI or a location determination system onboard mobile authentication device 12.

In step 23, if a pending request is found, the authentication application on mobile authentication device 12 displays the transaction details such as merchant name, item name, cost, account etc.

Authentication device 12 authenticates the user using adaptive authentication, and if the user is authenticated, it sends the user digital keys corresponding to the first transaction to communication server 14 in step 24. In step 25, application device 10 fetches for the digital keys for the first transaction from communication server 14. In step 26, if the digital keys are found, the user is authenticated to an application on application server 16 using the digital keys. In a preferred embodiment, application device 10 uses the digital keys to decrypt the user information (such as username and password . . . ) and uses the decrypted information to login or authenticate to an application on remote application server 16 in step 27. Authenticate device 12 can display confirmation information including transaction details, confirmation number, account . . . . If application device 10 does not find any updates or requests onboard communication server 14, the transaction is not authorized.

In a preferred embodiment, Application device 10 sends a confirmation message to authentication device 12.

In another preferred embodiment, Application device 10 transmits the user's physical access code to an RF ID reader using RF emulation/simulation techniques, generally through an RF ID emulator/simulator.

The application can be a server application, a cloud-based application, an intranet application, a payment application, a network access system, a door access system. The application has a fourth account corresponding to the first user account. Application device 10 periodically posts a verification request to communication server 14, and verifies that a response is posted to that verification request. If application device 10 does not obtain an update corresponding to the verification request, it performs the following action or actions: lock access to the fourth application, cloak the interface to the fourth application, cancel the first transaction.

Figure 3:
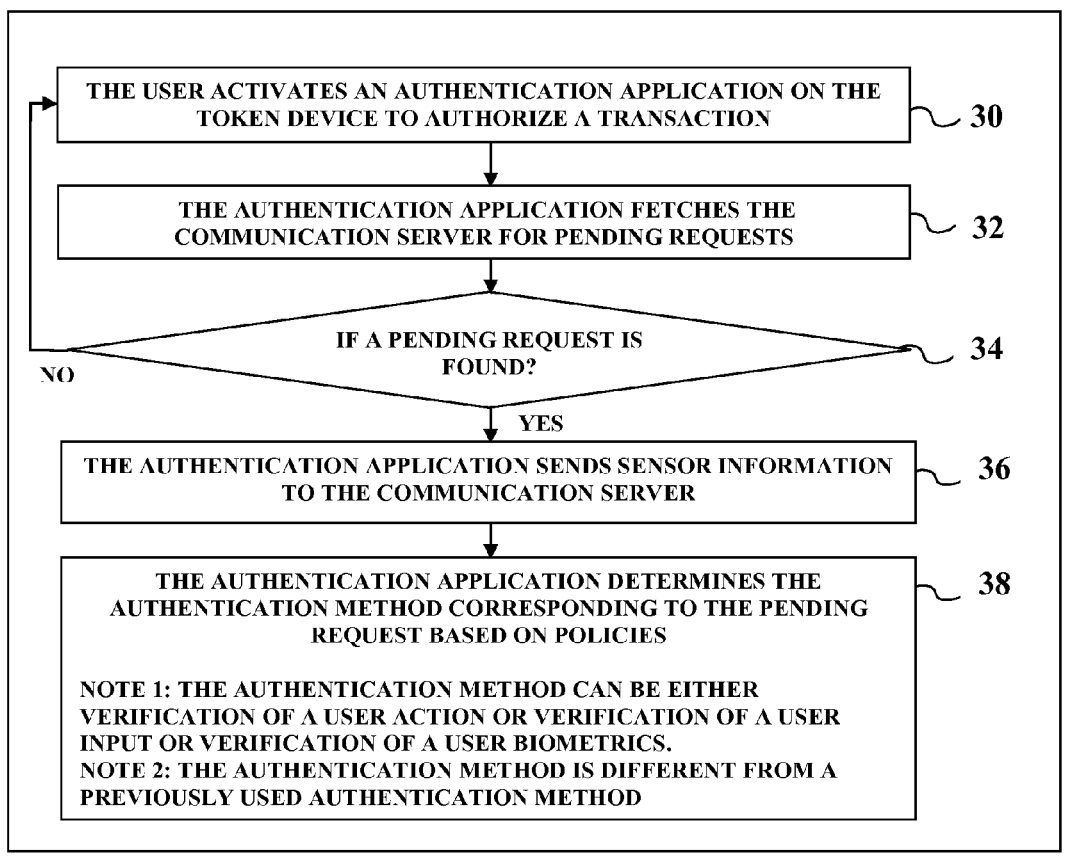
FIG. 3 is a flowchart illustrating adaptive authentication.

Referring to FIG. 3, the flowchart illustrates a method for adaptive authentication. In step 30, a user activates an authentication application on a smart phone mobile authentication device 12 to authorize a transaction that was previously initiated on application device 10. The authentication application fetches communication server 14 for pending requests in step 32, and if step 34, if a pending request is found, the authentication application can capture sensor information such as current GPS location, current motion (acceleration, gyro, tilt), current visible RF networks and their strength (Wifi, Bluetooth, cellular), current lighting level, current audio level, current temperature . . . . The authentication application can send this information to communication server 14.

the authentication application determines the authentication method corresponding to the pending request based on policies in step 36.

Several options can apply:
1—The policies are stored in the authentication application. The authentication application obtains the sensor information, and executes the policy that corresponds to that sensor information to determine the user authentication method:
  verify that the application can be accessed from the current location
  verify that the application can be accessed from the RF signal landscape
  verify that the application can be accessed with the current motion pattern
  verify that the application can be accessed with the current temperature level, sound level, lighting level . . . .
  verify a button is activated or a menu is selected or a display is touched or an application is brought to the foreground,
  verify a pass code or a motion or a signature or a spoken phrase,
  verify biometric information,
2—The policies are stored in communication server 14 or can be passed by the application that initiated the operation, which is application device 10. Communication sever 14 can obtain the sensor information from mobile authentication device 12, and determine the authentication method that will be executed. Communication server 14 sends a code to authentication device 12 indicating the authentication method that will be executed.
3—A set of first level policies are stored in communication server 14 and executed on communication server 14 in order to generate a set of conditional directives for authentication device 12. Authentication device 12 obtains sensor information, and executes the conditional directives and possibly some locally stored policies The policies can be driven by:
1) Location risk: the user current location, i.e. in a country or in a state . . . or the user relative distance from a known location or a known fixture, i.e. distance from merchant terminal 10, distance from home location, or if the user device is on a known WIFI network or not, or if the user device is near a known RF beacon,
2) Transaction risk: The policies can be driven by a transaction profile, i.e. total purchase is above a threshold amount. The policies can be driven by a transaction history or a transaction pattern, i.e. user has made purchases that he/she was not used to make. They can also be driven by a device profile.
3) User risk: The policies can be driven by a user profile, i.e. credit history.

The authentication method can be
1) Verification of a user action such as a button or icon push, a display touch, a motion, a spoken word, an application brought to the foreground
2) Verification of a user input such as verify a pass code or a motion or a signature or a spoken phrase or a response to a challenge question in the form of typing/data entry, e.g. "What is your pet's name">>The user must answer with "Bobo" to pass the test.
3) Verification of biometric information such as finger prints, a hand signature, a response to a challenge question in the form of hand writing, a voice sample, a response to a challenge question in the form of voice response, fingerprint/iris/facial authentication If is noted that the challenge question is different from a previously displayed or issued challenge question It is noted that when obtaining a biometric response to a first challenge question, the biometric response is authenticated using a reference answer set corresponding to the first challenge question, Authentication application can use any one of the authentication method automatically depending on the policies. Also, if the parameters for a transaction n are different from those of a transaction n+1, the authentication method used for a transaction n is different from the authentication method used for transaction n+1.

For example, if the current geo-location of mobile authentication device 12 or application device 10 is within a pre-determined distance from a pre-defined location or if the transaction amount is below a threshold or if the application does not have sensitive data, the authentication application does not request a pass code;

The predefined location can be set by configuring GPS of office locations. The employee home address can be derived from his/her address, or can be set by the user clicking on a menu when they are at the trusted location.

if the current location is not within a pre-determined distance from a known location or if the transaction amount is above a threshold or if the application has some sensitive data, the authentication application requests a pass code;

if the current location is outside a pre-determined geo-fence (i.e. zone) or if the transaction matches a pre-determined profile or if the transaction amount is above a threshold or the application has highly sensitive data, the third authentication application requests biometric information. Also, if the transaction matches a risk profile using a fraud detection system . . . then the user may be subject to different authentication procedure such as text challenge (where user is requested to respond to a random question that he knows) or voice biometrics.

Mobile authentication device 12 can generate onetime passwords automatically and send them to communication server 14.

Authentication device 12 can get a token for communication server 14, sign it using PKI, and post it to communication sever 14.

Mobile authentication device 12 uses a microphone for capturing a sample user voice during initiation and configuration phase. The sample of user voice can be compared to an existing sample of the original user's voice. If correlation factor is above a threshold, the user is authenticated.

The biometric sensor can be an accelerometer for capturing accelerations corresponding to user hand signature and authenticating the user signature against stored user signatures.

The biometric identification signature can be a sample or a pre-processed sample of the user's signature, voice, finger print, iris scan or distinguishing biometric identification. The identification signature can also include variations that correspond to different user conditions, tones, states, moods, etc. Upon receipt of an event or a message to authenticate the user or upon detection of an event—such as wrong PIN code, change of driver, reset, detection of unknown conditions, a predetermined period of time elapses, the user may be requested to provide biometric information.

Mobile authentication device 12 may include an onboard accelerometer, motion sensor or tilt detector.

Mobile authentication device 12 may include a crypto chipset for hashing, encryption, AES256, SHA256, Apple Authentication chipset, a secure memory location or a Secure Element for storing the user password, username and password, random key, one-time-password generated using a one-time-password generator, certificate, Private Key Infrastructure key, symmetric key, asymmetric key, private key, public key, signed key, encryption key, decryption key, payment information.

Figure 4:
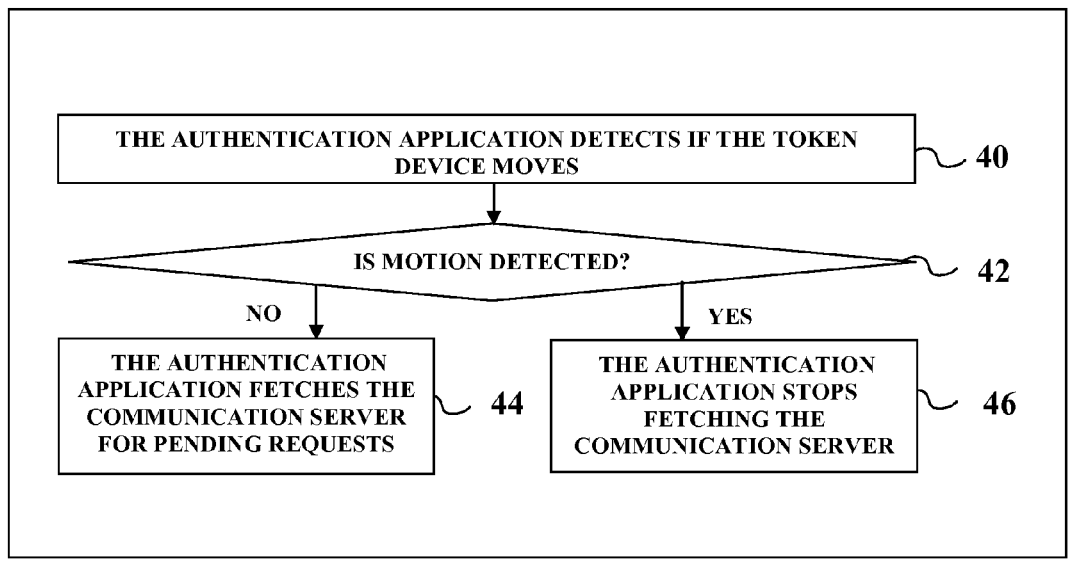
FIG. 4 is a flowchart illustrating a method for monitoring a user

Referring to FIG. 4, the flowchart illustrates a method for monitoring a user. In step 40, the authentication application detects if the user device moves. In step 42, if motion is detected, i.e. If the authentication device 12 detects motion or acceleration signals that are above a pre-determined threshold, the authentication application stops fetching the communication server in step 46. If motion is not detected, the authentication application fetches communication server 14 for pending requests. When the authentication application stops fetching and updating the communication server 46, the application onboard the application device 10 does not get the authentication information and locks, cloaks, closes, encrypt data.

Figure 5:
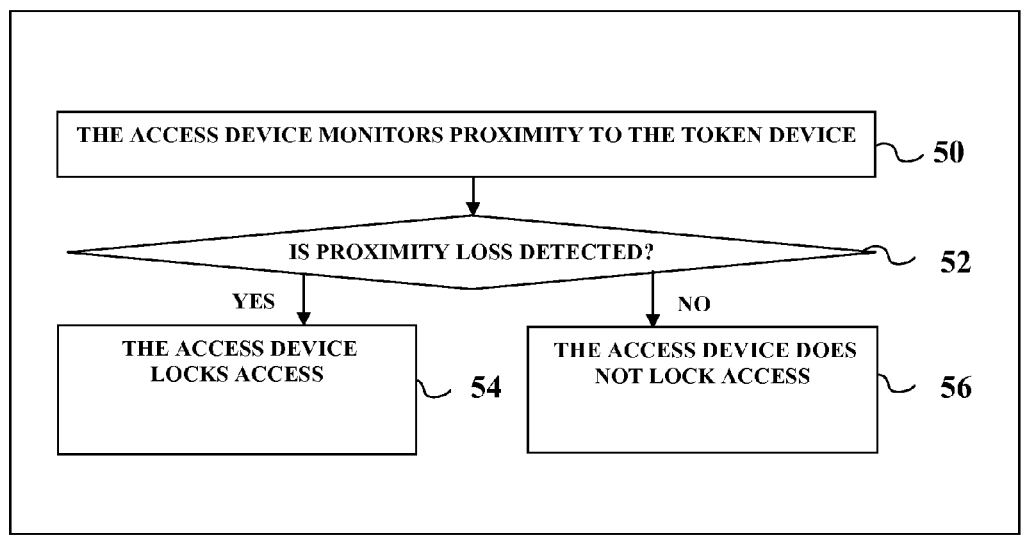
FIG. 5 is a flowchart illustrating another alternative for monitoring user proximity

Referring to FIG. 5, the flowchart illustrates another alternative for monitoring user proximity. In step 50, application device 10 monitors Bluetooth proximity to mobile authentication device 12. In step 52, if the Bluetooth signal falls below a threshold, application device 10 locks access to an application or cloaks the screen in step 54 . . . . In step 56, application device 10 does not lock access.

Figure 6:
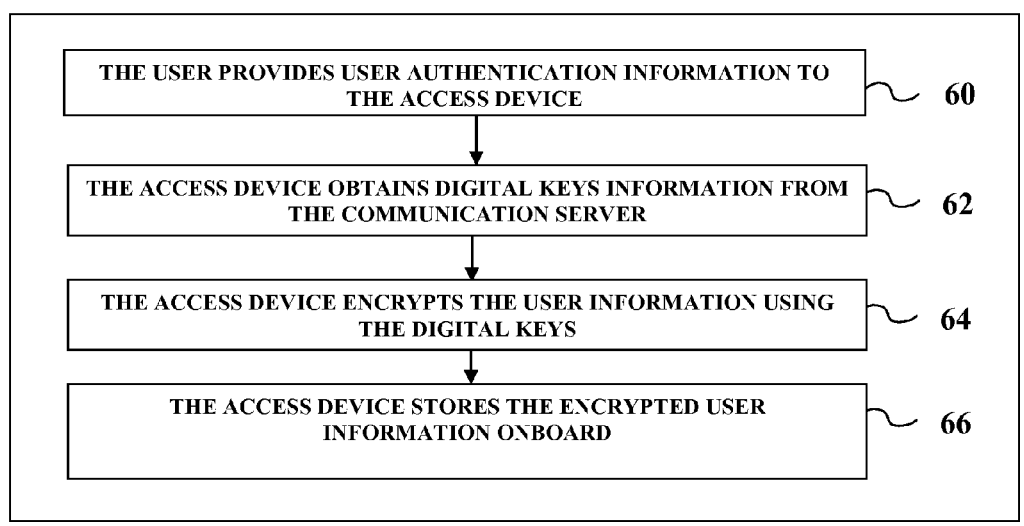
FIG. 6 is a flowchart illustrating a method for configuring auto-login

Referring to FIG. 6, the flowchart illustrates a method for configuring auto-login. The invention involves a one-time configuration phase whereby the user provides authentication information such as username/password onboard application device 10. The authentication information enables authorization to target service. The authentication information is encrypted using digital keys obtained from mobile authentication device 12 through communication server 14. The authentication information is stored onboard application device 10. The encrypted authentication information can comprise: a password, a username and password, a random key, a one-time-password generated using a one-time-password generator, a certificate, a Private Key Infrastructure key, a symmetric key, an asymmetric key, a private key, a public key, a signed key, an encryption key, a decryption key, payment information. In step 60, application device 10 obtains information from the user that enables authentication or login to the application server 16. In step 62, application device 10 obtains digital keys information from communication server 14. The digital keys are provided using mobile authentication device 12. In step 64, application device 10 encrypts the user information using the digital keys and other information (such as user PIN, device ID, username, password . . . ). In step 66, application device 10 stores the encrypted user information onboard.

Figure 7:
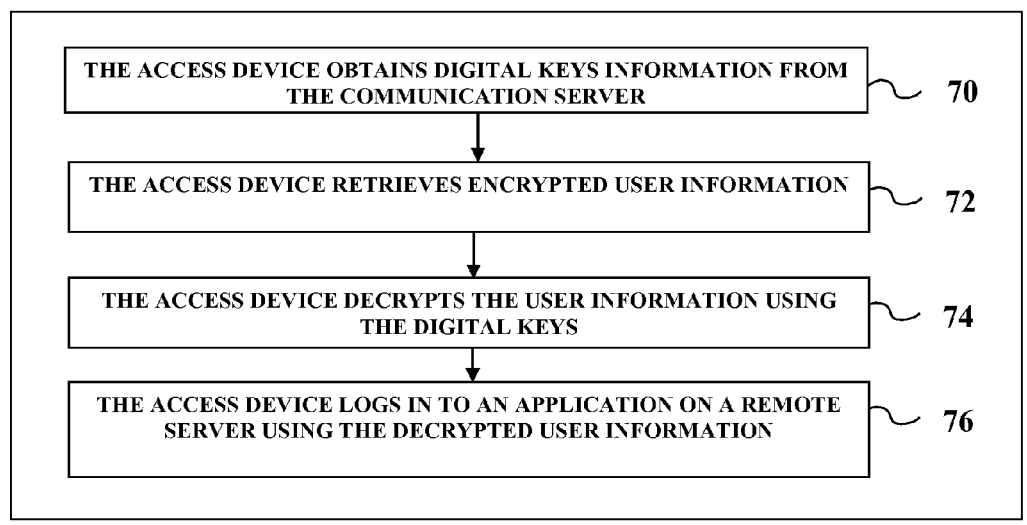
FIG. 7 is a flowchart illustrating a method for auto-login

Referring to FIG. 7, the flowchart illustrates a method for auto-login. The invention enables no-password login, so that after a first user authentication, the user passwords will be decrypted and typed to corresponding applications using auto-fill—the passwords are encrypted and distributed over several devices, and are never stored on the cloud or in a single database. Also, when the user moves or separates from the device, the user applications cloak and the auto-fill stops.

In step 70, application device 10 obtains digital keys information from communication server 14. The digital keys are provided using mobile authentication device 12.

In step 72, application device 10 retrieves encrypted user information from memory. In step 74, application device 10 decrypts the user information using the obtained digital keys as well as other information such as the user PIN, the device ID, the username, password, account information . . . . In step 76, application device 10 sends a request for authentication, authorization or login to an application onboard a remote application server 16 comprising the decrypted user information.

In a preferred embodiment, a wrapper engine takes the user application for application device 10 and generates a wrapped version. The wrapper engine inserts object code into executables such as IPA for iOS and APK for Android. For web pages, the wrapper engine insert some code in the HTML or PHP file.

The wrapped versions enable to communication with communication server 14 for posting and retrieving updated transactions. It enables to provide password auto-fill, and can enable to lock or cloak the application if the user moves or is separated from his/her terminal.

Figure 8:
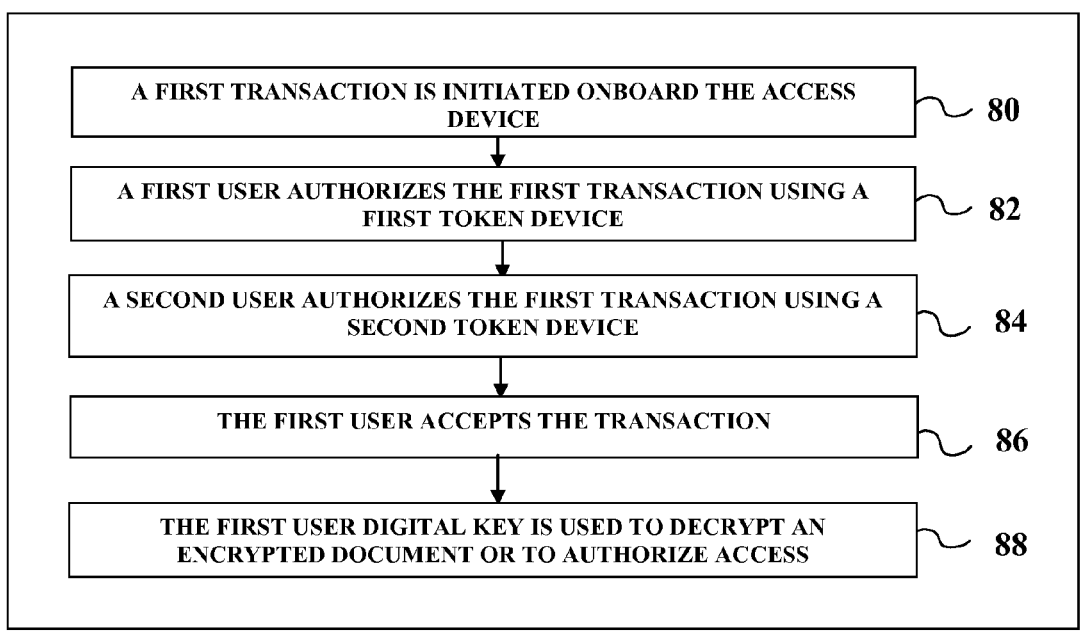
FIG. 8 is a flowchart illustrating a method for two-man rule

Referring to FIG. 8, a flowchart illustrates a method for two-man rule. In step 80, a first transaction is initiated onboard application device 10.

In step 82, a first user authentication the first transaction using a first mobile authentication device 12. In step 84, a second user authentication the first transaction using a second mobile authentication device 12. In step 86, the first user accepts the first transaction using the first mobile authentication device 12 and in step 88, the first user digital key is used to decrypt encrypted data, or to authorize access, or to login to a third system. In an alternative embodiment, the user digital key is used to unlock a lock, to uncloack an application, to authenticate to a remote server, to authorize a transaction, to transmit user information wirelessly to a second terminal (such as to emulate an RF ID card, and send the RF ID card information wirelessly to an RF ID door reader) or to call a script or API.

Figure 9:
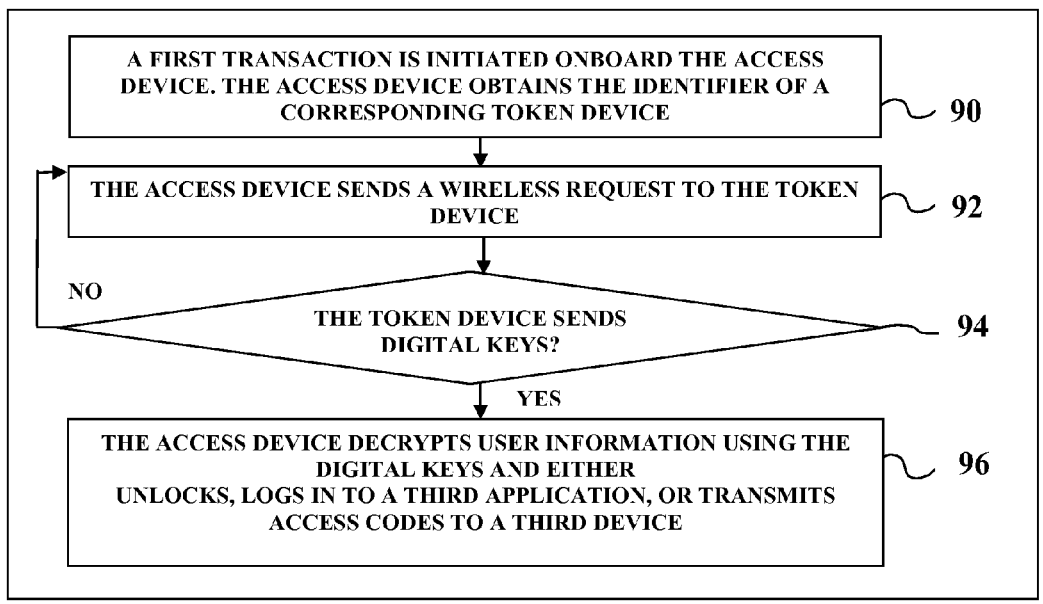
FIG. 9 is a flowchart illustrating an alternative method for adaptive facilitating authentication using a mobile device.

Referring to FIG. 9, a flowchart illustrates a method for facilitating authentication using a smart phone. In step 90, a first transaction is initiated onboard application device 10. Application device 10 obtains the identifier of a corresponding authentication device 12 from memory or from a database. In step 92, Application device 10 connects to authentication device 12 and sends a wireless request for authentication to the authentication device 12. Authentication device 12 runs an authentication application and stores digital keys (a password, a random key, a one-time-password generator, a certificate, a Private Key Infrastructure (PKI) key, a symmetric key, an asymmetric key, payment information, access information, physical access code) in secure memory such as key chain or secure element. In step 94, if the authentication device 12 returns digital keys, in step 96, the application device 10 decrypts previously stored user information using the digital keys and:

1—Unlock a locked application
2—Uncloak a cloaked application
3—Log in to a third application using the decrypted user information
4—Transmit access codes to a third device using an RF ID emulator
5—Decrypt access codes and transmits them to a third device using an RF ID emulator
6—Decrypt payment information and use them to execute a payment transaction
7—Decrypt a document or a data stream If an application is unlocked or uncloaked, the application device 10 monitors proximity to authentication device 12 and if the proximity falls below a threshold, locks or cloaks again. If in step 94, the authentication device 12 does not return digital keys, application device 10 does not unlock, uncloak, login . . . .

If step 94, the authentication device 12 can authenticate the user using a method such as:

verify a button is activated or a menu is selected or a display is touched or an application is brought to the foreground,
authenticate a pass code,
authenticate a response to a challenge question,
authenticate biometric information,
verify that both the third mobile device and a fifth mobile device authorized the first transaction, wherein the fifth mobile device is distinct from the third mobile device The authentication method used on time is different from the authentication method used at another time. That is because authentication methods and timeouts change depending on location (trusted, un-trusted, no network), transaction risk ($ amount . . . ) user risk (transaction history . . . )

In another preferred embodiment, Application device 10 scans devices wirelessly, and checks the found devices against a list of authorized devices, if more than one know devices are found, the first application terminal displays a list of labels corresponding to the found devices, Upon a user selecting a label, the first application terminal requests a pass code corresponding to the selected label, and identifies the user.

In a preferred embodiment, application device 10 sends an authentication code to authentication device 12, the authentication code correspond to actions that will be carried by authentication device 12 including: verify a button is activated or a menu is selected or a display is touched or an application is brought to the foreground, authenticate a pass code, authenticate a response to a challenge question using a sample set stored onboard authentication device 12, authenticate biometric information using a sample set stored onboard authentication device 12.

The code for adaptive authentication can be compiled into a security layer object code and injected into the object code of another application. This enables fast implementation without coding or development, as well as consistent implementation. The features of adaptive authentication can be controlled through a policy console. The security layer can load the policies from the policy database.

Figure 10:
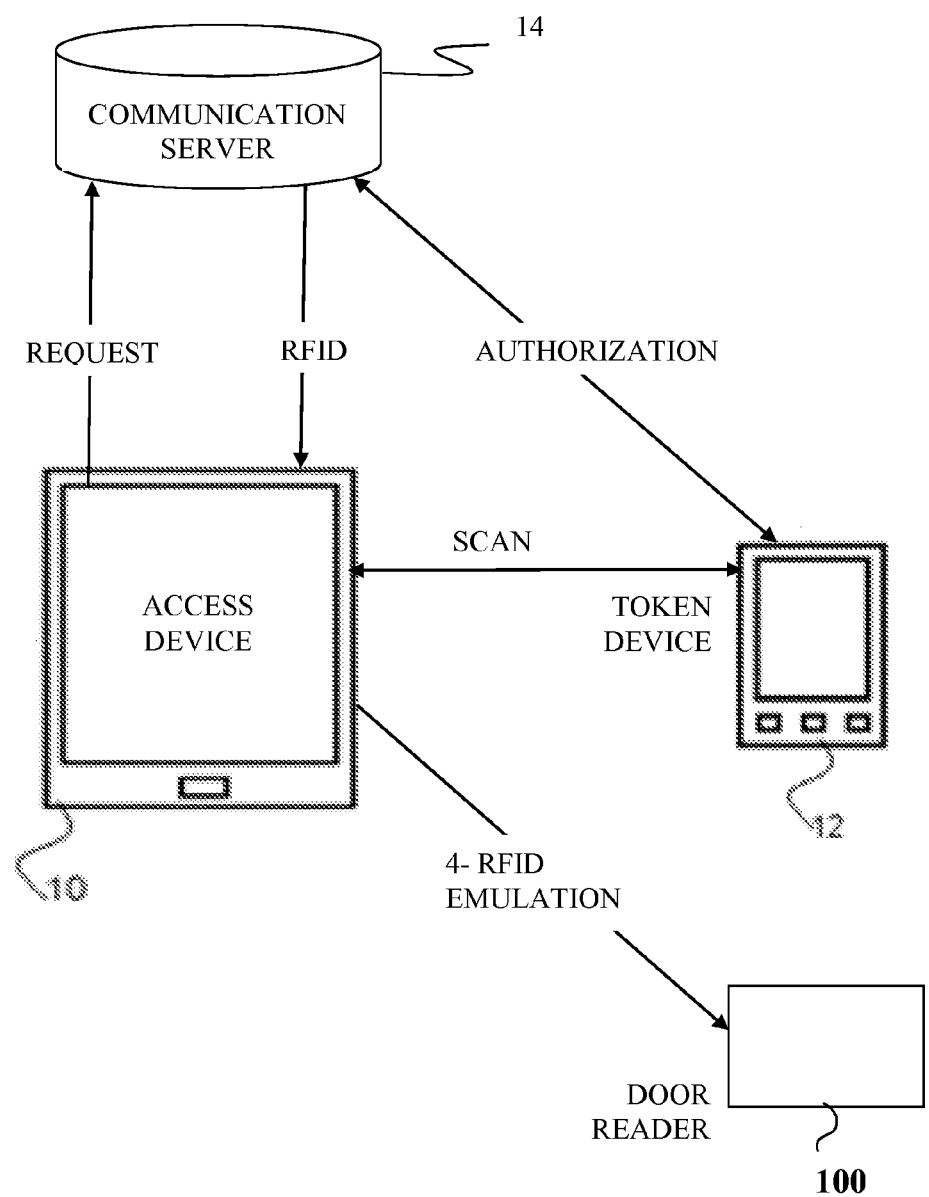
FIG. 10 is a schematic illustrating a cloud-based adaptive authentication system to open a door reader.

Referring to FIG. 10, a cloud-based adaptive authentication system using a smart phone according to a first embodiment including a door reader 100. After authorization, the user terminal obtains the RFID code corresponding to the user. It emulates the RFID code using an RFID emulator in order to communicate with the door reader.

Figure 11:
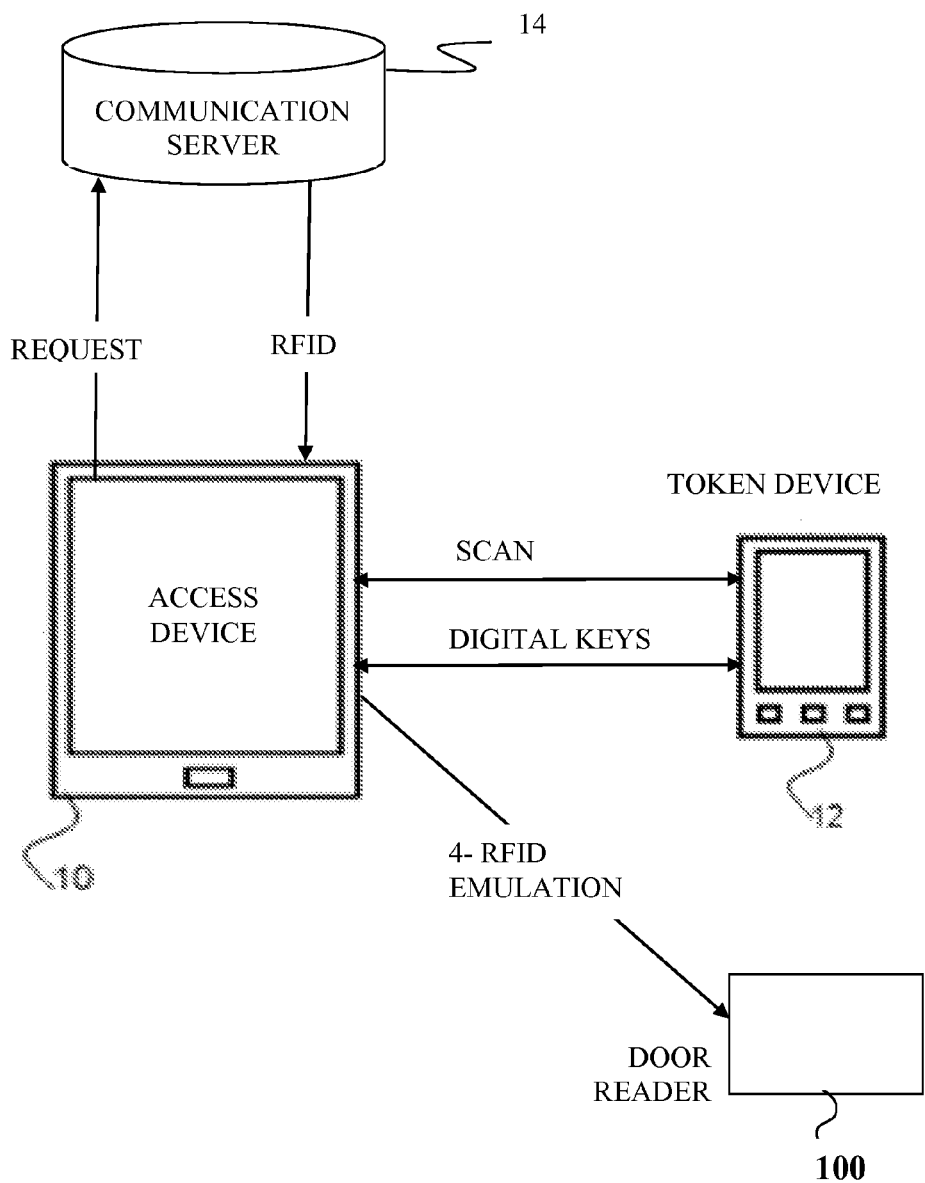
FIG. 11 is an alternative schematic illustrating an adaptive authentication system to open a door reader.

Referring to FIG. 11, a cloud-based adaptive authentication system using a smart phone according to a first embodiment including a door reader 100. After authorization, the user terminal obtains the RFID code corresponding to the user. It emulates the RFID code using an RFID emulator in order to communicate with the door reader.

The current invention teaches using an access device and a token device. The token device is physically separated from the access device, and the token device and the access device can communicate using short wireless communication when the distance between the token device and the access device is more than 30 cm. The invention involves storing at least one digital key onboard the token device. The digital key can be a password, a random key, a one-time-password generator, a certificate, a digital key, a Private Key Infrastructure (PKI) key, a symmetric key, an asymmetric key, a payment information, and an access information.

The invention involves obtaining a token identifier wirelessly, and checking if the token identifier is authorized for access, performing an authentication action depending on a context selected from the group consisting of: data profile, application profile, user profile, access device profile, current time, current policy, current location and current motion, The authentication action corresponds to a method selected from the group consisting of: "something only the user has", "something only the user knows", and "something only the user is", and wherein the requested authentication action is different from a second authentication action requested for a different user transaction with a different context; obtaining at least one second key using short wireless communication. The at least one second key corresponds to the at least one digital key from the token device.

The at least one second key is used to perform an action selected from the group consisting of: decrypt encrypted stream of data in real-time, decrypt encrypted data, login to an application, unlock a screen, unlock a door lock, authorize a transaction, emulate an RFID identifier, and activate a badge reader.

The current invention teaches using an access device and a token device. The token device physically separated from the access device. The token device and the access device can communicate wirelessly when the distance between the token device and the access device is more than 30 cm.

The invention stores at least one digital key onboard the token device. The at least one digital key is selected from the group consisting of: a password, a random key, a one-time-password generator, a certificate, a digital key, a Private Key Infrastructure (PKI) key, a symmetric key, an asymmetric key, a payment information, and an access information.

The invention automatically obtains at least one token identifier wirelessly, if the at least one token identifier is authorized for access, performs an authentication action depending on a context selected from the group consisting of: data profile, application profile, user profile, access device profile, current time, current policy, current location and current motion. The authentication action corresponds to a method selected from the group consisting of: "something only the user has", "something only the user knows", and "something only the user is", 2. and wherein the requested authentication action is different from a second authentication action requested for a different user transaction with a different context. The invention automatically changes the factor of authentication based on context. The invention obtains at least one second key, this can be an encryption key or RFID code. The at least one second key corresponds to the at least one digital key from the token device. The at least one second key is used to perform an action selected from the group consisting of: decrypt encrypted stream of data in real-time, decrypt encrypted data, login to an application, unlock a screen, unlock a door lock, authorize a transaction, emulate an RFID identifier, and activate a badge reader.

The current invention displays decrypted data on the access device; if the token device is more than a predetermined distance from the access device or if the token device senses motion above a predetermined threshold, the decrypted data is cloaked or not displayed.

The invention change a login screen with a password input field with a new login screen, wherein the new login screen does not have the password input field.

The invention provides a new login screen that obtains encrypted user credentials stored onboard the access device The invention teaches obtaining location information from the token device and storing it as a trusted location, when the token device is in the trusted location, the authentication method defaults to "something only the user has".

The invention teaches a training mode, the token device obtains the current location information of the token device and stores it as a trusted location, during login mode, the token device obtains the new current location information of the token device and compares it to the trusted location. If the new current location is determined to be away from the trusted location, the authentication method defaults to "something only the user has" or "something only the user is"

The invention teaches using an access device, a remote server and a token device, wherein the token device physically separated from the access device, and wherein the token device and the access device can communicate wirelessly through the remote server; during a pairing mode, storing a token identifier corresponding to the token device and an RFID identifier corresponding to an RFID access system account in a user account onboard the access device or onboard the remote server, wherein the token identifier corresponding to the token device can be scanned using short wireless communication; during an operation mode, scanning with short wireless communication, obtaining at least one token identifier corresponding a token device, sending a transaction request corresponding to the at least one token identifier to the remote server; obtaining information corresponding to the transaction request on the token device that corresponds to the at least one token identifier, automatically requesting an authentication action onboard the token device depending on a context selected from the group consisting of:

the location where the user transaction is issued, the profile of the user transaction, user information, the profile of the access device, time of day and current motion state of the token device, wherein the authentication action corresponds to a method selected from the group consisting of: "something only the user has", "something only the user knows", and "something only the user is", and wherein the requested authentication action is different from a second authentication action requested for a different user transaction with a different context; obtaining an update corresponding to the transaction request for the token identifier, wherein the update comprises information corresponding to an RFID identifier, and wherein the information is used by the access device to emulate a code to an RFID reader.

The invention teaches scanning with short wireless communication is started after detecting an object within 10 cm from the access device.

The invention teaches storing at least two biometric reference information corresponding to at least two challenge questions; displaying a first challenge question, wherein the first challenge question is different from a previously displayed challenge question; obtaining a first voice input, authenticating the first voice input using biometric reference information corresponding to the first challenge question; wherein if the authentication is successful, authorization is granted.

The invention teaches storing at least one biometric reference information corresponding to a user; obtaining a new photo using an onboard camera means; authenticating the new photo using at least one biometric reference information; whereby if authentication is successful, authorization is granted.

The invention teaches obtaining a request from an access device, generating a first key onboard the token device or obtaining the first key, storing the first key onboard the token device, sending a second key corresponding to the first key to the access device, wherein the second key is used to encrypt user credentials, and wherein the encrypted user credentials are stored onboard the access device.

In this invention, the "something the user has" is verified by either the token device detecting a touch or the user terminal detecting the token device within a predetermined distance, and the "something only the user knows" is verified by capturing a pass code or a motion or a signature or a spoken phrase,
and the "something only the user is" is verified by capturing biometric information using the token device or the access device.

The invention enables real-time data decryption, auto-login, stream decryption while providing stepped up authentication, and while loggin the client off, or hiding the data when the client walks away.

The invention enables default denial to data whereby the data can be encrypted and stored encrypted all the time on any device and in any application, and only decrypted in real-time with the user's presence and physical proximity.

The invention enables to provide access and decryption with a single token device: Bluetooth communication for devices and applications that support Bluetooth and cloud communication for those that do not support Bluetooth.

Another feature is to support Bluetooth LE communication for token devices or user devices that support Bluetooth LE (such as iPhone 4S, 5 . . . ), Bluetooh 2.0 communication for token devices and user devices that do not support Bluetooth LE (Windows7.0) and cloud communication for applications that do not support any of the above, for example browser applications.

This invention also enables to lock the data on any device with Bluetooth proximity (signal loss, or signal below threshold) or with user motion detected on the token device.

This invention enables one way to get in and out of any application on any device using the token device. It also provides one way for stepped up authentication for any data on any device.

The current invention descries a unitary apparatus for changing authentication for a legacy access interface, having a processor, a proximity sensor means, a Bluetooth transceiver, a WI-FI transceiver or a cellular transceiver, and an emulator. The apparatus can be a mobile phone or hardware adapter.

In the old system, upon the legacy access interface receives a valid access code corresponding to a user, the legacy access interface activates a secure system, for example, and HID door control reader activates a lock upon detection of a valid RFID card. Similarly an application interface unlocks the application upon detection of a valid password. In this case, the valid RFID card or the valid password will be emulated using an emulator means.

Upon the proximity sensor means onboard the unitary apparatus detects an object within a pre-determined short proximity of the unitary apparatus or upon detection of a user request—for example, an infrared sensor can detect a hand or an object in front, or a touch sensor detects a user finger activating a display icon or selecting a menu, the Bluetooth transceiver onboard the unitary apparatus automatically scans Bluetooth devices within a pre-determined short proximity. The pre-determined short proximity exceeds 5 CM, i.e. more than the distance that NFC can read. If a Bluetooth-enabled compatible token device is found, the processor onboard the unitary apparatus issues a transaction request for the compatible token device. This reader finds compatible Bluetooth mobile phones and tokens in proximity, and sends a request for authentication corresponding to the found token device. The request is sent via Bluetooth to the found token device, or via a long wireless networks, i.e. WI-FI or cellular to the found token device via a remote server.

Upon an authorization application on the compatible token device is used to authorize the transaction request,
the valid access code corresponding to the compatible token device is obtained on the unitary apparatus, and the emulator sends a Radio Frequency Identification signal comprising the valid access code to the legacy access interface, or sends a code to the legacy interface via keyboard and mouse emulation (i.e. via the operating system). One the valid access code is provided to the legacy access interface, the legacy access interface (e.g. HID door reader or an application interface) activates the secure system (e.g. unlocks the door, login to an application).

The current invention describes a method for changing authentication for a legacy access interface. Previously, the legacy access interface activates a secure system upon receipt of a valid access code. This method uses an access adapter and a token device. Upon detection of an object within a first pre-determined short proximity of the access adapter (e.g. infrared detector) or upon detection of a user request (user click), automatically scan Bluetooth devices within a second pre-determined short proximity of the access adapter. If a Bluetooth-enabled compatible token device is found, issue a transaction request for the compatible token device. Upon authorizing the transaction request using an authorization application on the compatible token device, automatically obtain the valid access code corresponding to the compatible token device onboard the access adapter. Automatically emulate the valid access code to the legacy access interface using a Radio Frequency Identification signal, and automatically activate the secure system.

The current invention describes a method for changing authentication for a legacy access interface, wherein the legacy access interface activates a secure system upon receipt of a valid access code. Upon detection of an object within a first pre-determined short proximity of the access adapter or upon detection of a user request, automatically scan Bluetooth devices within a second pre-determined short proximity of the access adapter. If a Bluetooth-enabled compatible token device is found, issue a transaction request for the compatible token device. Upon authorizing the transaction request using an authorization application on the compatible token device, automatically obtain the valid access code corresponding to the compatible token device onboard the access adapter, automatically emulate the valid access code to the legacy access interface, and automatically activate the secure system (e.g. HID, Windows, cloud, mobile app) or automatically remove a lock screen to display an existing application interface. This method enables to access an application using proximity and no password by removing the lock screen. If proximity is lost, the lock screen is displayed again.

The digital keys are stored onboard the compatible token device. It is also important that on detection of the at least one token device separating from the access adapter, the token device or the access interface automatically sends an indication to a legacy application. The token device and/or access interface can detect separation through wireless Bluetooth monitoring, infrared, ultrasound, GPS or motion monitoring. The indication enables the legacy application to lock since the user is no longer there.

To authorize a transaction request, a user may activate a display icon onboard the compatible token device.

The authentication application requests an adaptive authentication factor onboard the compatible token device. The requested adaptive authentication factor changes dynamically depending on a transaction context which can be: a current location of the token device, a current time of day, a user history or score, a device type, an issuing application name or code and a transaction amount. The adaptive authentication factor can be a knowledge factor (PIN, motion, code), a possession factor (token, mobile phone . . . ), and an inherence factor (voice biometrics).

The adaptive authentication can change the authentication factor automatically and dynamically. For a first transaction, it is different from a second adaptive authentication factor requested for a different transaction with a different transaction context.

The unitary apparatus issues a transaction request to a user account on a remote server. The user account on the remote server corresponds to the compatible token device. It updates the transaction request using the authorization application on the compatible token device.

The unitary apparatus can update a user account on a remote server with a request. The authorization application can get the request, authorize it and update the user account with an authorization code. The access adapter then gets the authorization code, and emulates the valid access code corresponding to the authorization code to the legacy access interface.

The access adapter can store encrypted data in the user account on the remote server. The token device can get the encrypted data, decrypt it using the authorization application onboard the compatible token device and using digitals keys stored on it, and update the user account with the decrypted data, generally through encrypted communication. The access adapter can obtain the decrypted data and emulate the valid access code corresponding to the decrypted data to the legacy access interface, and cause it to open or unlock.

The access adapter can encrypt data using a public key corresponding to the user account and store the encrypted data. The public key is obtained from a user account on a remote server. The compatible token device containing the corresponding private key can obtain the encrypted data, decrypt it using the authorization application onboard the compatible token device and using a private key stored on it, and update the user account with the decrypted data. The access adapter can obtain the decrypted data and emulate the valid access code corresponding to the decrypted data to the legacy access interface.

The access adapter can store the encrypted data.

The access adapter can enable multiple users to access the secure system. It can encrypt at least two sets of data corresponding to at least two user accounts using at least two public keys, and store the encrypted at least two sets of data on the access adapter. Once a user requests access, it stores encrypted data corresponding to one of the encrypted at least two sets of data in the user account on the remote server. The compatible token device obtains the encrypted data and decrypts it using the authorization application onboard the compatible token device and using a private key stored onboard the compatible token device and corresponding to the public key used previously for encryption. It later updates the user account with the decrypted data. The decrypted data is obtained onboard the access adapter, which emulates the valid access code corresponding to the decrypted data to the legacy access interface.

The activation of the secure system comprises an action selected from the group consisting of: display information, unlock a screen, unlock a door lock, login to an application, authorize a transaction, emulate a Radio Frequency Identification signal, and activate a badge reader.

If the compatible token device is more than a predetermined distance from the access adapter, data is cloaked automatically. The proximity is determined using Bluetooth signal strength measurement or using GPS or motion.

It is noted that if the location information is outside a pre-determined zone, the adaptive authentication factor defaults to a possession factor, e.g. having a token or a mobile phone or the adaptive authentication factor defaults to an inherence factor, e.g. voice authentication or voice authentication challenge.

It is noted that the access adapter can store at least two biometric reference information corresponding to at least two challenge questions onboard the compatible token device, display a challenge question, that changes from a previously displayed challenge question, obtain a voice sample, and authenticate the voice sample using the stored biometric reference information corresponding to the displayed challenge question. If the authentication is successful, authorization is granted.

The access adapter can be a Radio Frequency Identification adapter, an application wrapper, an application plug-in, an I/O emulator—e.g. keyboard emulator—and a web page.

The token device or access adapter can obtain configuration parameters from the user account on the remote server, which indicate what authentication factor to apply for a transaction context. Upon authorizing the transaction request using an authorization application on the compatible token device, the parameters corresponding to the transaction context are obtained, and the authentication factor corresponding to the transaction context is applied.

The access adapter can obtain configuration parameters from the user account on the remote server, indicating what authentication factor to apply for a transaction context, and upon detection of a compatible token device, the parameters corresponding to the token device are obtained, and the authentication factor corresponding to the toke device or to the transaction context is applied.

Another objective of the invention is to enable multiple encrypted data (or encrypted streams of data) for multiple users to be obtained encrypted on the user's device (example user sharing a device). Each user can be identified with his token device proximity, and his/her data can be decrypted.

The details of certain embodiments of the present inventions have been described, which are provided as illustrative examples so as to enable those of ordinary skill in the art to practice the inventions. The summary, figures, abstract and further details provided are not meant to limit the scope of the present inventions, but to be exemplary. Where certain elements of the present inventions can be partially or fully implemented using known components, only those portions of such known components that are necessary for an understanding of the present invention are described, and detailed descriptions of other portions of such known components are omitted so as to avoid obscuring the invention. Further, the present invention encompasses present and future known equivalents to the components referred to herein.

The inventions are capable of other embodiments and of being practiced and carried out in various ways, and as such, those skilled in the art will appreciate that the conception upon which this disclosure is based may readily be utilized as a basis for the designing of other methods and systems for carrying out the several purposes of the present inventions. Therefore, the claims should be regarded as including all equivalent constructions insofar as they do not depart from the spirit and scope of the present invention. The following claims are a part of the detailed description of the invention and should be treated as being included in this specification.

The invention claimed is:

1. A non-transitory, computer readable medium storing instructions that when executed by a processor cause it to perform a method for changing authentication for a legacy access interface utilizing an access adapter and at least one Bluetooth-enabled device, the method comprising:
- by the access adapter:
  - detecting a user action or the presence of an object corresponding to a user request within a predetermined proximity of the access adapter;
  - automatically scanning Bluetooth devices within a pre-determined Bluetooth proximity of the access adapter;
  - determining if a Bluetooth-enabled device that has at least one stored digital key and that is authorized for access is within the pre-determined Bluetooth proximity of the access adapter;
  - transmitting a transaction request corresponding to a found Bluetooth-enabled device to the found Bluetooth-enabled device or to a database;
- and the method further comprising: by the found Bluetooth-enabled device:
  - obtaining the transaction request;
  - obtaining a user authorization;
  - authorizing the transaction request using an authorization application;
- and the method further comprising: by the access adapter:
  - automatically obtaining an access code corresponding to the found Bluetooth-enabled device from the found Bluetooth-enabled device or from the database;
  - performing an action selected from an action group consisting of:
  - automatically providing the access code directly from the access adapter to the legacy access interface, automatically keying in the access code to the legacy access interface, and automatically sending a Radio Frequency Identification signal comprising the access code to the legacy access interface;
- and the method further comprising: by the legacy access interface:
  - granting access to a user upon a successful verification of the access code.

2. A system for changing authentication for a legacy access interface, the system comprising a Bluetooth-enabled device and an access adapter hardware, the access adapter hardware comprising a processor, a proximity sensor, a Bluetooth transceiver, a WI-FI transceiver or a cellular transceiver, and a digital emulator;
- the proximity sensor is configured to detect the presence of an object corresponding to a user request within a pre-determined proximity of the access adapter hardware;
- the Bluetooth transceiver is configured to scan Bluetooth devices within a pre-determined Bluetooth proximity of the access adapter hardware;
- the WI-FI transceiver or cellular transceiver or Bluetooth transceiver is configured to transmit a transaction request corresponding to a found Bluetooth-enabled device that is authorized for access and that has at least one stored digital key, to the found Bluetooth-enabled device or to a database;
- the found Bluetooth-enabled device is configured to request a user authorization and to authorize the transaction request using an authorization application;
- the access adapter hardware is configured to automatically obtain an access code corresponding to the found Bluetooth-enabled device from the found Bluetooth-enabled device or from the database and to perform an action to enable access to a user at the legacy access interface, the action is selected from an action group consisting of:
- automatically provide the access code directly from the access adapter hardware to the legacy access interface, automatically key in the access code to the legacy access interface device, and automatically send a Radio Frequency Identification signal comprising the access code to the legacy access interface device.

3. A method for changing authentication for a legacy access interface utilizing an access adapter and at least one Bluetooth-enabled device, the method comprising:
- by the access adapter, the access adapter comprising hardware, software, or a combination of hardware and software:
- detecting a user action or the presence of an object corresponding to a user request within a predetermined proximity of the access adapter;
- automatically scanning Bluetooth devices within a pre-determined Bluetooth proximity of the access adapter;
- determining if a Bluetooth-enabled device that has at least one stored digital key and that is authorized for access is within the pre-determined Bluetooth proximity of the access adapter;
- transmitting a transaction request corresponding to a found Bluetooth-enabled device to the found Bluetooth-enabled device or to a database;
- and the method further comprising: by the found Bluetooth-enabled device:
- obtaining the transaction request;
- obtaining a user authorization;
- authorizing the transaction request using an authorization application;
- and the method further comprising: by the access adapter:
- automatically obtaining an access code corresponding to the found Bluetooth-enabled device from the found Bluetooth-enabled device or from the database;
- performing an action selected from an action group consisting of:
- automatically providing the access code directly from the access adapter to the legacy access interface, automatically keying in the access code to the legacy access interface, and automatically sending a Radio Frequency Identification signal comprising the access code to the legacy access interface;
- and the method further comprising: by the legacy access interface:
- granting access to a user upon a successful verification of the access code.

4. The method of claim 3, wherein the action group further comprises:
- automatically providing the access code to the legacy access interface, and
- upon detecting the found Bluetooth-enabled device separating from the access adapter,
- automatically sending an indication to a legacy application or automatically emulating a code or automatically displaying a lock screen.

5. The method of claim 3, wherein:
- authorizing the transaction request comprises activating a display icon on the found Bluetooth-enabled device,
- wherein the display icon corresponds to the authorization application.

6. The method of claim 3, further comprising:
- requesting an adaptive authentication factor on the found Bluetooth-enabled device,
- wherein the requested adaptive authentication factor changes dynamically depending on a transaction context selected from the group consisting of:
- a current location, a current time, a user history, a device type, an issuing application and a transaction amount,
- and wherein the adaptive authentication factor is selected from the group consisting of:

a knowledge factor, a possession factor and an inherence factor.

7. The method of claim 6, wherein:
the requested adaptive authentication factor for a first transaction is different from a second adaptive authentication factor requested for a different transaction with a different transaction context.

8. The method of claim 6, comprising:
obtaining a location information from the found Bluetooth-enabled device,
wherein if the location information is outside a pre-determined zone;
automatically changing the adaptive authentication factor to a possession factor or to an inherence factor.

9. The method of claim 3, further comprising:
issuing a transaction request to a user account on a remote server,
wherein the user account on the remote server corresponds to the found Bluetooth-enabled device;
and updating the transaction request using the authorization application on the found Bluetooth-enabled device.

10. The method of claim 9, further comprising:
updating the user account with a request from the access adapter;
updating the user account using the authorization application on the found Bluetooth-enabled device;
obtaining an authorization code corresponding to the found Bluetooth-enabled device at the access adapter;
and emulating the access code corresponding to the authorization code to the legacy access interface.

11. The method of claim 3, comprising:
storing an encrypted data in a user account on a remote server;
decrypting the encrypted data using the authorization application on the found Bluetooth-enabled device and using the at least one stored digital key;
and either displaying the decrypted data on the access adapter or emulating the access code corresponding to the decrypted data via the access adapter to the legacy access interface.

12. The method of claim 3, comprising:
encrypting data using a public key corresponding to a user account and storing it;
decrypting the encrypted data using the authorization application on the found Bluetooth-enabled device and a private key stored on the found Bluetooth-enabled device that corresponds to the public key;
and either display the decrypted data on the access adapter or use the access adapter to emulate the access code corresponding to the decrypted data to the legacy access interface.

13. The method of claim 12, comprising:
storing the encrypted data on the access adapter,
wherein detecting an object within a pre-determined proximity of the access adapter comprises detecting an object using infrared detection or detecting a user touch.

14. The method of claim 3, comprising:
encrypting at least two sets of data corresponding to at least two user accounts using at least two public keys and storing them on the access adapter;
storing an encrypted data corresponding to one of the encrypted at least two sets of data in a user account on a remote server using the access adapter;
decrypting the encrypted data using the authorization application on the found Bluetooth-enabled device corresponding to the one of the encrypted at least two sets of data and the private key corresponding to the public key of the one of the encrypted at least two sets of data;
and either displaying the decrypted data on the access adapter or using the access adapter to emulate the access code corresponding to the decrypted data to the legacy access interface.

15. The method of claim 3, wherein:
activation of the legacy access interface comprises an action selected from the group consisting of:
unlocking a door lock, unlocking a screen, logging in, authorizing a transaction and activating a motor.

16. The method of claim 3, comprising:
if the found Bluetooth-enabled device is more than a pre-determined Bluetooth proximity distance from the access adapter, automatically cloaking data.

17. The method of claim 3, comprising:
storing at least two biometric reference information corresponding to at least two challenge questions on the found Bluetooth-enabled device;
displaying a challenge question that is different from a previously displayed challenge question;
obtaining a voice sample;
authenticating the voice sample using the stored biometric reference information corresponding to the displayed challenge question;
and if the authentication is successful, authorizing the transaction request.

18. The method of claim 3, wherein:
the access adapter is selected from the group consisting of:
a Radio Frequency Identification emulator, an application wrapper with keyboard emulation capabilities, an application plug-in with keyboard emulation capabilities, and a web page with emulation capabilities.

19. The method of claim 3, comprising:
obtaining configuration parameters from a user account on a remote server indicating an authentication factor corresponding to transaction context parameters;
and upon or after authorizing the transaction request using an authorization application on the found Bluetooth-enabled device;
obtaining the transaction context parameters,
applying the authentication factor corresponding to the transaction context parameters.

20. The method of claim 3, wherein:
obtaining configuration parameters from a user account on a remote server indicating an authentication factor corresponding to transaction context parameters or to a Bluetooth-enabled device;
upon detection of the Bluetooth-enabled device;
applying the authentication factor corresponding to the found Bluetooth-enabled device or corresponding to transaction context parameters.

* * * * *